(12) United States Patent
Nakamura et al.

(10) Patent No.: US 8,993,955 B2
(45) Date of Patent: Mar. 31, 2015

(54) ENCODER AND APPARATUS USING THE SAME

(71) Applicant: Canon Kabushiki Kaisha, Tokyo (JP)

(72) Inventors: Hitoshi Nakamura, Kawasaki (JP); Chihiro Nagura, Yokohama (JP)

(73) Assignee: Canon Kabushiki Kaisha (JP)

( * ) Notice: Subject to any disclaimer, the term of this patent is extended or adjusted under 35 U.S.C. 154(b) by 235 days.

(21) Appl. No.: 13/650,805

(22) Filed: Oct. 12, 2012

(65) Prior Publication Data

US 2013/0099105 A1     Apr. 25, 2013

(30) Foreign Application Priority Data

Oct. 14, 2011    (JP) ................................. 2011-227200

(51) Int. Cl.
*G01D 5/34* (2006.01)
*G01D 5/347* (2006.01)

(52) U.S. Cl.
CPC ............ *G01D 5/347* (2013.01); *G01D 5/34776* (2013.01); *G01D 5/34792* (2013.01)
USPC ............ 250/231.13; 250/231.14; 250/231.18; 356/616; 341/13

(58) Field of Classification Search
CPC . G01D 5/347; G01D 5/3473; G01D 5/34707; G01D 5/34746; G01D 5/34776
USPC ............. 250/231.13, 231.14, 231.16, 231.18; 356/614, 616, 617, 619; 33/1 PT, 1 N; 341/11, 13
See application file for complete search history.

(56) References Cited

U.S. PATENT DOCUMENTS

| | | | |
|---|---|---|---|
| 6,496,266 B1 | 12/2002 | Nishioki | |
| 7,276,687 B2 * | 10/2007 | Okada | ...................... 250/231.13 |
| 7,663,093 B2 | 2/2010 | Kusano | |
| 8,525,102 B2 * | 9/2013 | Augustyniak et al. | ... 250/231.13 |
| 2005/0236560 A1 * | 10/2005 | Ch'ng et al. | ............. 250/231.13 |

FOREIGN PATENT DOCUMENTS

| | | |
|---|---|---|
| JP | 07-270182 A | 10/1995 |
| JP | 09-021603 A | 1/1997 |
| JP | 2000-258188 A | 9/2000 |
| JP | 2000-283701 A | 10/2000 |
| JP | 2009-002702 A | 1/2009 |

* cited by examiner

*Primary Examiner* — Kevin Pyo
(74) *Attorney, Agent, or Firm* — Rossi, Kimms & McDowell LLP

(57) ABSTRACT

The encoder includes a scale including first and second periodic patterns, and a detector relatively movable with respect to the scale and whose detection state is switchable between a first detection state to read the first periodic pattern and output a first signal and a second detection state to read the second periodic pattern and output a second signal. A processor performs a first process to detect a first absolute position by using the first and second signals and then performs a second process to calculate a relative movement amount by using a specific signal that is one of the first and second signals and detect a second absolute position by using the relative movement amount and the first absolute position. The specific signal is obtained from the detector set in a same detection state as that set last in the first process.

11 Claims, 4 Drawing Sheets

| TIME | 0 | Δt | 2Δt | ... | t | t+Δt | t+2Δt |
|---|---|---|---|---|---|---|---|
| PHASE | $\theta_{P2\_1}$ | $\theta_{Q2}$ | $\theta_{P2\_2}$ | ... | $\theta_{P1\_1}$ | $\theta_{Q1}$ | $\theta_{P1\_2}$ |
| | | | | | | $\theta_{P1}$ | |
| | | | | | | $\theta_{V8}$ | |
| | | $\theta_{P2}$ | | | | $\theta_{P2t}$ | |
| | | $\theta_{V1}$ | | | | $\theta_{V1t}$ | |

ENCODER AND APPARATUS USING THE SAME

BACKGROUND OF THE INVENTION

1. Field of the Invention

The present invention relates to an encoder that is usable for various apparatuses such as optical apparatuses and outputs, with relative movement of a scale and a sensor, a signal showing position of a movable member provided in the apparatus.

2. Description of the Related Art

Encoders that are used to detect position and speed of a movable member are constituted by a scale provided with a periodic pattern and a sensor outputting a periodic signal that periodically changes corresponding to the periodic pattern with relative movement of the sensor and the scale. Such encoders include an incremental encoder that, for example, produces two periodic signals (two phase signals) having mutually different phases from one periodic pattern and detects a relative position of the scale and the sensor from a frequency and the phases of the two phase signals. Moreover, the encoders also include an absolute encoder that, for example, produces two paired two phase signals from two periodic patterns having mutually different periods and detects an absolute position of the scale or the sensor from a difference (phase difference) between the phases of one of the two paired two phase signals and the phases of the other paired two phase signals.

Such an absolute encoder has an advantage that a reset operation to detect a reference position for position detection before start of the position detection such as at a time of power-on, which is needed for the incremental encoder, is not needed. Japanese Patent Laid-Open No. 2000-283701 discloses an absolute encoder using three periodic patterns (scales).

However, the absolute encoder has to read more numbers of the periodic patterns than the incremental encoder, and thereby needs multiple detectors corresponding to the number of the periodic patterns, which makes a configuration of the encoder complex.

An absolute encoder in which the number of the detectors is reduced can be realized by providing multiple periodic patterns having mutually different periods in the scale and by time-sequentially switching a detection period of the detector in the sensor (that is, by switching a reading target periodic pattern).

However, such an absolute encoder involves the following problem: immediately after switching the detection period of the detector in the sensor, a certain amount of time is necessary for a signal outputting element such as a light-receiving element or a magnetic detection element that constitutes the detector to output a stable periodic signal (analogue signal), which causes delay in the position detection at each switching of the detection period.

SUMMARY OF THE INVENTION

The present invention provides an encoder that is operable to switch the detection period corresponding to the multiple periodic patterns and operable to avoid the delay in the position detection.

The present invention provides as an aspect thereof an encoder including a scale provided with a first periodic pattern and a second periodic pattern having a period larger than that of the first periodic pattern, a detector relatively movable with respect to the scale and whose detection state is switchable between a first detection state to read the first periodic pattern and output a first signal having a changing period corresponding to the first periodic pattern and a second detection state to read the second periodic pattern and output a second signal having a changing period corresponding to the second periodic pattern, and a processor. The processor is configured to perform a first process to detect a first absolute position by using both the first and second signals respectively obtained from the detector set in the first and second detection states and to perform, after performing the first process, a second process to calculate a relative movement amount by using a specific signal that is one of the first and second signals obtained from the detector set in one of the first and second detection states and detect a second absolute position by using the relative movement amount and the first absolute position. The processor is configured to obtain in the second process the specific signal from the detector set in a same detection state of the first and second detection states as that set last in the first process.

The present invention provides as an aspect thereof an apparatus including the above-described encoder, and a movable member whose position is detected by the encoder.

DESCRIPTION OF THE PREFERRED EMBODIMENTS

Embodiments of the present invention will hereinafter be described with reference to the accompanying drawings.

Embodiment 1

Figure 1:
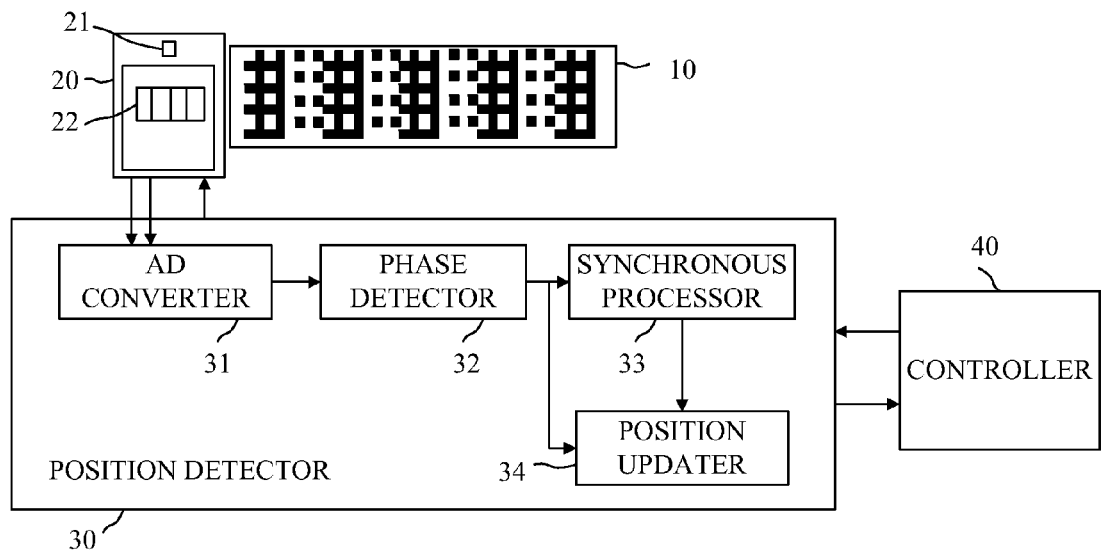
FIG. 1 is a block diagram showing a configuration of an encoder that is Embodiment 1 of the present invention.

FIG. 1 shows a configuration of an encoder that is a first embodiment (Embodiment 1) of the present invention. The encoder is constituted by a scale 10, a sensor 20, a position detector 30 and a controller 40. The position detector 30 and the controller 40 constitute a processor.

The encoder of this embodiment is an optical reflective absolute encoder that detects, by relative movement of the scale 10 and the sensor 20, an absolute position of one of the scale 10 and the sensor 20 to the other thereof. This embodiment describes a case where, in an apparatus equipped with this encoder, the scale 10 is attached to a movable member (not shown) that is a detection target of the absolute position and the sensor 20 is attached to a fixed (immovable) member. However, a configuration may be employed in which the sensor 20 is attached to the movable member and the scale 10 is attached to the fixed member to detect the absolute position of the movable member. Moreover, although this embodiment describes a linear encoder, a rotary encoder can be configured as well as this embodiment.

In response to input of a position detection request signal from a system (not shown) of the apparatus equipped with the encoder, the controller 40 causes the position detector 30 that receives signals from the sensor 20 to perform a position detection process. Then, the controller 40 outputs information on the absolute position of the movable member which has produced by the position detector 30, to the system of the apparatus.

Figure 2:
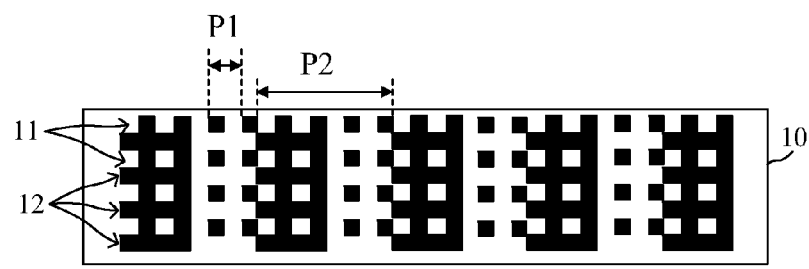
FIG. 2 shows a scale to be used in the encoder of Embodiment 1.

FIG. 2 shows the scale 10. In the following description, as directions for the scale 10, a relative movement direction of the scale 10 and the sensor 20 is referred to as "a longitudinal direction", and a direction orthogonal to the longitudinal direction is referred to as "a width direction". The scale 10 is provided with two periodic patterns (a first periodic pattern 11 and a second periodic pattern 12) each of which includes reflective portions and non-reflective portions alternately arranged in the longitudinal direction at a constant period (pitch). The first periodic pattern 11 and the second periodic pattern 12 respectively have the pitches P1 and P2 different from each other and are alternately arranged in the width direction. In the following description, the first periodic pattern 11 is simply referred to as "a first pattern 11", and the pitch P1 thereof is referred to as "a first pitch P1". Moreover, the second periodic pattern 12 is simply referred to as "a second pattern 12", and the pitch P2 thereof is referred to as "a second pitch P2".

The first pitch P1 is set to about ¼ of the second pitches P2, that is, the second pattern 12 has a period larger (coarser) than that of the first pattern 11. The first pattern 11 includes 79 periods and the second pattern 12 includes 20 periods in a total length of a longitudinal range where the first and second patterns 11 and 12 are provided in the scale 10. The total length of that longitudinal range where the first and second patterns 11 and 12 are provided is hereinafter referred to as "a total pattern length".

The sensor 20 includes, as shown in FIG. 1, a light source 21 and a light receiver (detector) 22. The light source 21 is constituted by a light emitting element such as an LED. The light receiver 22 is constituted by multiple photoelectric conversion elements (light receiving elements) that photoelectrically convert light emitted from the light source 21 and reflected by the reflective portions of the first and second patterns 11 and 12.

Moreover, the sensor 20 switches a detection period of the light receiver 22, in response to a detection period switch signal from the position detector 30, between a first detection period P0 and a second detection period 4·P0. The first detection period P0 is identical or sufficiently close to the first pitch P1, and the second detection period 4·P0 is identical or sufficiently close to the second pitch P2. The light receiver 22 is brought into a first detection state of enabling reading of the first pattern 11 in response to setting of the first detection period. The switching of the detection period is performed by changing, among the plurality of the light receiving elements constituting the light receiver 22, a combination of the light receiving elements forming each of two or more light receiving areas to change a width and a pitch of the light receiving area in the relative movement direction of the sensor 20 and the scale 10.

The light receiver 22 reads the first pattern in the first detection state to output two phase sine-wave signals each having a change period corresponding to the first pitch P1 and having a phase difference of 90 degrees. The two phase sine-wave signals thus produced from the first pattern 11 correspond to a first signal and are hereinafter referred to as "first two phase signals". On the other hand, the light receiver 22 is brought into a second detection state of enabling reading of the second pattern 12 in response to setting of the second detection period. The light receiver 22 reads the second pattern 12 in the second detection state to output two phase sine-wave signals each having a change period corresponding to the second pitch P2 and having a phase difference of 90 degrees. The two phase sine-wave signals thus produced from the second pattern 12 correspond to a second signal and are hereinafter referred to as "second two phase signals".

The position detector 30 performs the position detection process described below by using the first and second two phase signals output from the sensor 20 (light receiver 22). The controller 40 controls, in response to the input of the position detection request signal from the system of the apparatus, the switching of the detection period of the sensor 20 (that is, output of the detection period switch signal from the position detector 30) and the position detection process performed by the position detector 30.

Next, description will be made of the position detection process performed by the position detector 30. The position detection process includes a first process and a second process performed after the first process. The first process detects (or calculates) a first absolute position of the scale 10 (that is, of the movable member) by using both the first and second two phase signals respectively obtained from the light receiver 22 whose detection period is set to the first and second detection periods. The second process detects (calculates) a relative movement amount of the scale 10 (movable member) and the sensor 20 by using one of the first and second two phase signals obtained from the light receiver 22 set in one of the first and second detection periods. Moreover, the second process detects (calculates) a second absolute position of the scale 10 by using the detected relative movement amount and the first absolute position. In this embodiment, the second process detects the relative movement amount by using the first two phase signals.

At first, the first process sets the detection period of the sensor 20 (light receiver 22) to the first detection period P0 in response to the detection period switch signal from the position detector 30. With this setting, the sensor 20 outputs the first two phase signals corresponding to the first pattern 11. The position detector 30 samples the first two phase signals through an A/D converter 31.

After the sampling of the first two phase signals, the first process switches the detection period of the sensor 20 (light receiver 22) to the second detection period 4·P0 in response to the detection period switch signal from the position detector 30. With this switched setting, the sensor 20 outputs the second two phase signals corresponding to the second pattern 12. The position detector 30 samples the second two phase signals through the A/D converter 31.

Furthermore, after the sampling of the second two phase signals, the first process switches the detection period of the sensor 20 (light receiver 22) to the first detection period P0 in response to the detection period switch signal from the position detector 30. Then, the position detector 30 samples the first two phase signals through the A/D converter 31.

In this way, the first sampling of the first two phase signals, the second sampling of the second two phase signals and the third sampling of the first two phase signals are performed in this order. Then, the three pairs of the above tow phase signals are converted into digital signals by the A/D converter 31, and the digital signals are input to a phase detector 32. The samplings are performed at a constant time interval. In the following description, a sampling time at which the first sampling is performed is defined as 0, a sampling time at which the second sampling is performed is defined as t, and a sampling time at which the third sampling is performed is defined as 2t.

The phase detector 32 calculates a phase of each pair of the two phase signals by performing arctan calculation on the three pairs of the two phase signals. The two phase signals are constituted by a sine-wave signal and a cosine-wave signal, so that the arctan calculation provides the phase. In the following description, the phase of the first two phase signals obtained by the first sampling is represented by $\theta_{P1\_1}$, the phase of the second two phase signals obtained by the second sampling is represented by $\theta_{P2}$, and the phase of the first two phase signals obtained by the third sampling is represented by $\theta_{P1\_2}$. The phase is expressed within a range from 0 to less than $2\pi$, and shows a position in one pitch (period) because each phase corresponds to each position in one pitch.

The three phases calculated by the phase detector 32 are input to a synchronous processor 33. The synchronous processor 33 calculates an absolute position from the three phases. Since the sampling times for the three phases $\theta_{P1\_1}$, $\theta_{P2}$ and $\theta_{P1\_2}$ are mutually different, the three phases correspond to mutually different positions when the scale 10 and the sensor 20 are relatively moved. Thus, in this embodiment, the synchronous processor 33 calculates the absolute position at the time 2t.

The phases $\theta_{P1\_1}$ and $\theta_{P1\_2}$ are both a phase of the first two phase signals corresponding to the first pattern 11, and their sampling times are 0 and 2t, respectively. Therefore, a relative movement speed of the scale 10 and the sensor 20 can be estimated on a basis of a change amount between the phases $\theta_{P1\_1}$ and $\theta_{P1\_2}$ and of a change amount between the times 0 and 2t. The relative movement speed u is calculated by the following expression (1):

$$u = \frac{P_1 \cdot \frac{(\theta_{P1\_2} - \theta_{P1\_1})}{2\pi}}{2t} \tag{1}$$

Since the sampling time for the phase $\theta_{P2}$ is the time t, a phase $\theta_{P2\_2}$ that is a phase of the second two phase signals corresponding to the second pattern at the time 2t is calculated as the following expression (2) by adding to the phase $\theta_{P2}$ a change amount of the phase for a period of time t at the relative movement speed u.

$$\theta_{P2\_2} = \theta_{P2} + \frac{2\pi u t}{P_2} = \theta_{P2} + (\theta_{P1\_2} - \theta_{P1\_1}) \cdot \frac{P_1}{P_2} \cdot \frac{1}{2} \tag{2}$$

The synchronous processor 33 calculates the absolute position by using the thus obtained two phases $\theta_{P1\_1}$ and $\theta_{P2\_2}$ at the time 2t.

At first, the synchronous processor 33 quadruples the phase $\theta_{P2\_2}$ of the second two phase signals corresponding to the second pattern 12 that includes 20 periods in the total pattern length to produce a phase for 80 periods. Then, the synchronous processor 33 calculates a difference (phase difference) between the phase for 80 periods and the phase $\theta_{P1\_2}$ of the two phase signals corresponding to the first pattern 11 that includes 79 periods in the total pattern length, which results in that the phase difference is one period in the total pattern length. The phase difference of one period in the total pattern length provides the absolute position. The phase difference represented by $\theta_{V1}$ is expressed by the following expression (3) where MOD(x,y) represents a remainder when x is a dividend and y is a divisor.

$$\theta_{V1} = \text{MOD}(4 \cdot \theta_{P2\_2} - \theta_{P1\_2}, 2\pi) \tag{3}$$

Although the phase difference $\theta_{V1}$ expresses the absolute position, accuracy of the absolute position in one period is higher when using $\theta_{P1\_2}$ and $\theta_{P2\_2}$ than $\theta_{V1}$. Therefore, the synchronous processor 33 calculates a more accurate absolute position than $\theta_{V1}$ by using $\theta_{P1\_2}$ and $\theta_{P2\_2}$ together with $\theta_{V1}$.

Since the second pattern 12 includes 20 periods in the total pattern length, $\theta_{P2\_2}$ changes from 0 to $2\pi$ twenty times therein. On the other hand, $\theta_{V1}$ changes from 0 to $2\pi$ once in the total pattern length, which means that a phase change amount of $\theta_{V1}$ per a unit movement amount is 1/20 of that of $\theta_{P2\_2}$. Thus, the synchronous processor 33 calculates a number of periods (period number) for $\theta_{P2\_2}$ from a predetermined reference position by using $\theta_{V1}$ and $\theta_{P2\_2}$, and thereby calculates an absolute position with an accuracy attainable by using $\theta_{P2\_2}$.

Figure 3:
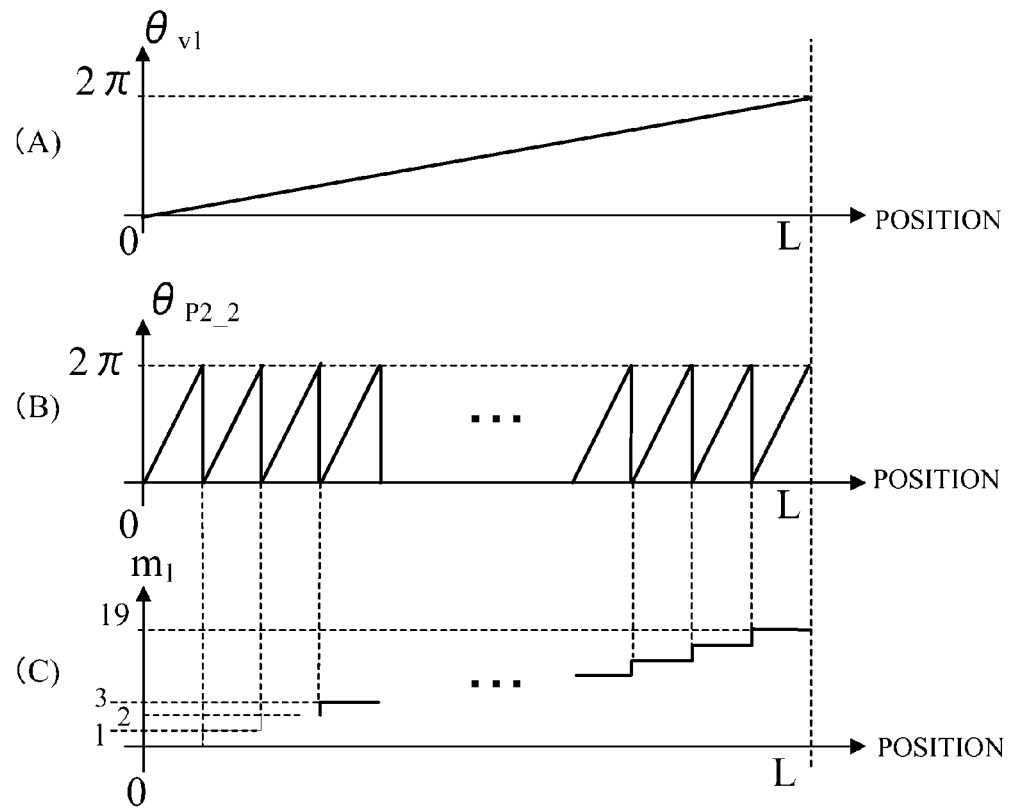
FIG. 3 shows a relationship among positions and variables in the encoder of Embodiment 1.

When the period number for $\theta_{P2\_2}$ is represented by $m_1$ and the total pattern length is represented by L, a relationship among $\theta_{V1}$, $\theta_{P2\_2}$ and $m_1$ is as illustrated in FIG. 3.

In addition, when the absolute position calculated with the accuracy attainable by using $\theta_{P2\_2}$ is represented by $\theta_1$, this $\theta_1$ is expressed by the following expressions (4) and (5) using $m_1$ and $\theta_{P2\_2}$, where ROUND(x) represents rounding of x to an integral value.

$$m_1 = \text{ROUND}\left(\frac{20 \cdot \theta_{V1} - \theta_{P2\_2}}{2\pi}\right) \tag{4}$$

$$\theta_1 = \frac{2\pi m_1 + \theta_{P2\_2}}{20} \tag{5}$$

Next, the synchronous processor 33 similarly calculates, from $\theta_1$ and $\theta_{P1\_2}$, an absolute position $\theta_2$ with an accuracy attainable by using $\theta_{P1\_2}$. In this calculation, since the first pattern 11 includes 79 periods in the total pattern length, $\theta_2$ is expressed by the following expressions (6) and (7) where $m_2$ represents a period number for $\theta P_{1\_2}$.

$$m_2 = \text{ROUND}\left(\frac{79 \cdot \theta_1 - \theta_{P1\_2}}{2\pi}\right) \tag{6}$$

$$\theta_2 = \frac{2\pi m_2 + \theta_{P1\_2}}{79} \tag{7}$$

The synchronous processor 33 sets the thus calculated absolute position (first absolute position) $\theta_2$ to a position updater 34. The position updater 34 outputs information on the absolute position $\theta_2$ to the controller 40. The controller 40 outputs the information on the absolute position $\theta_2$ to the system of the apparatus. Then, the first process is ended.

Next, description of the second process will be made. The second process calculates the relative moment amount of the movable member (scale 10) and the sensor 20 by using the first two phase signals as one of the first and second two phase signals. Then, the second process adds this relative movement amount to the absolute position $\theta_2$ calculated in the first process as a reference position to calculate a second absolute position as a new absolute position of the movable member (scale 10).

The second process also reads the first pattern 11 to produce the first two phase signals, but does not read the second pattern 12 (that is, does not produce the second two phase signals), which is different from the first process. In other words, the second process performs the following calculation by using the first two phase signals obtainable at the first detection period which is one of the first and second detection periods settable for the light receiver 22 and is the same detection period as that set last in the first process (that is, in the calculation of the first absolute position).

The sensor 20 (light receiver 22) needs a certain amount of time to stably output the two phase signals after switching of the detection period of the light receiver 22. Thus, no switching of the detection period of the sensor 20 at a transition from the first process to the second process enables a rapid start of the second process. Such a rapid start of the second process makes it possible to reduce a time needed for detecting the position of the movable member.

In the second process, the position detector 30 samples the first two phase signals through the A/D converter 31 with the first detection period P0 which is the same detection period of the sensor 20 as that set last in the first process. Then, the phase detector 32 calculates a phase $\theta_{P1\_3}$ of the first two phase signals. The phase $\theta_{P1\_3}$ corresponds to a relative movement amount of the scale 10 and the sensor 20 after the second process is started.

The phase $\theta_{P1\_3}$ is input to the position updater 34. The position updater 34 calculates an absolute position $\theta_3$ from the phase $\theta_{P1\_3}$ and the absolute position $\theta_2$ calculated in the first process by using the following expressions (8) and (9) where $m_3$ represents a period number for the phase $\theta_{P1\_3}$.

$$m_3 = \text{ROUND}\left(\frac{79 \cdot \theta_2 - \theta_{P1\_3}}{2\pi}\right) \tag{8}$$

$$\theta_3 = \frac{2\pi m_3 + \theta_{P1\_3}}{79} \tag{9}$$

The position updater 34 outputs the absolute position (second absolute position) $\theta_3$ thus calculated to the controller 40. The controller 40 outputs information on the absolute position $\theta_3$ to the system of the apparatus. Then, the second process is ended. Thereafter, performing the second process repeatedly with reference to the absolute position calculated by the previous second process enables continuous calculation of the absolute position of the movable member.

As described above, this embodiment calculates the relative movement amount (relative position) and furthermore the absolute position (second absolute position) by using the first two phase signals obtained with the first detection period which is the same detection period as that set last for the light receiver 22 when calculating the first absolute position in the first process, which eliminates a necessity of switching the detection period of the light receiver 22 at the transition from the first process to the second process. Therefore, it is not necessary to wait for stabilization of the two phase signals after the transition from the first process to the second process as in a case of switching the detection period. Thereby, this embodiment can rapidly start the second process after the transition, which can reduce the amount of time needed for position detection by the position detection process. Moreover, the reduction of the amount of time needed for the position detection enables suppression of generation of a position detection error caused by a counting error of the number of periods when the scale 10 and the sensor 20 are relatively displaced in a direction different from the longitudinal direction of the scale 10.

Although this embodiment described the case of calculating the relative movement speed and then performs the position detection after correcting the phase with the relative movement speed, the correction is not necessarily needed in a case where the relative movement speed is sufficiently slow. In this case, when the position detection is performed from the phases $\theta_{P1\_1}$, $\theta_{P2}$, and $\theta_{P1\_2}$ corresponding to the three samplings as described in this embodiment, the position detection may be made from $\theta_{P2}$ and $\theta_{P1\_2}$ without sampling $\theta_{P1\_1}$. Specifically, $\theta_{P2}$ may be regarded as equal to $\theta_{P2\_2}$ in the expression (2). Such omission of the correction can further reduce the time needed for the position detection.

In the case of performing the correction with the relative movement speed, an error signal may be output when the calculated relative movement speed is faster than an upper limit relative movement speed (threshold).

In addition, although this embodiment described the case of detecting (calculating) the position at the time 2t as the absolute position in the first process, a position at a time different from 2t may be detected as the absolute position. For example, detecting a position at the time 0 as the absolute position enables detection of a position at a timing close to an input timing of the position detection request signal. This example is suitable for a case where the system of the apparatus requires the position at the input timing of the position detection request signal. Moreover, calculating a position at the time t as the absolute position enables reduction of calculation amount since the phase of the first two phase signals can be calculated as an average of $\theta_{P1\_1}$ and $\theta_{P1\_2}$, which makes it possible to reduce the time needed for the position detection.

Furthermore, although this embodiment described the case of performing the position detection in response to the position detection request signal, a configuration may be employed which provides a timer in the controller 40 to perform the position detection at a constant time interval. This configuration provides advantages such as making it hard to receive an influence of jitter of a communication time for the position detection request signal and making it easy to design the encoder independently from the system of the apparatus.

Moreover, although this embodiment described the encoder using the two periodic patterns having mutually different periods (pitches), three or more periodic patterns having mutually different periods may be used. Increasing a number of the periodic patterns enables reduction of a position detection error or increase of a length range of the position detection. In the case of using three or more periodic patterns having coarse (large), middle and fine (small) periods, for example, the fine periodic pattern can be considered to correspond to the first periodic pattern, and the middle or coarse periodic pattern can be considered to correspond to the second periodic pattern. The fine or middle periodic pattern may be considered to correspond to the first periodic pattern, and the coarse periodic pattern may be considered to correspond to the second periodic pattern.

Embodiment 2

Figure 4:
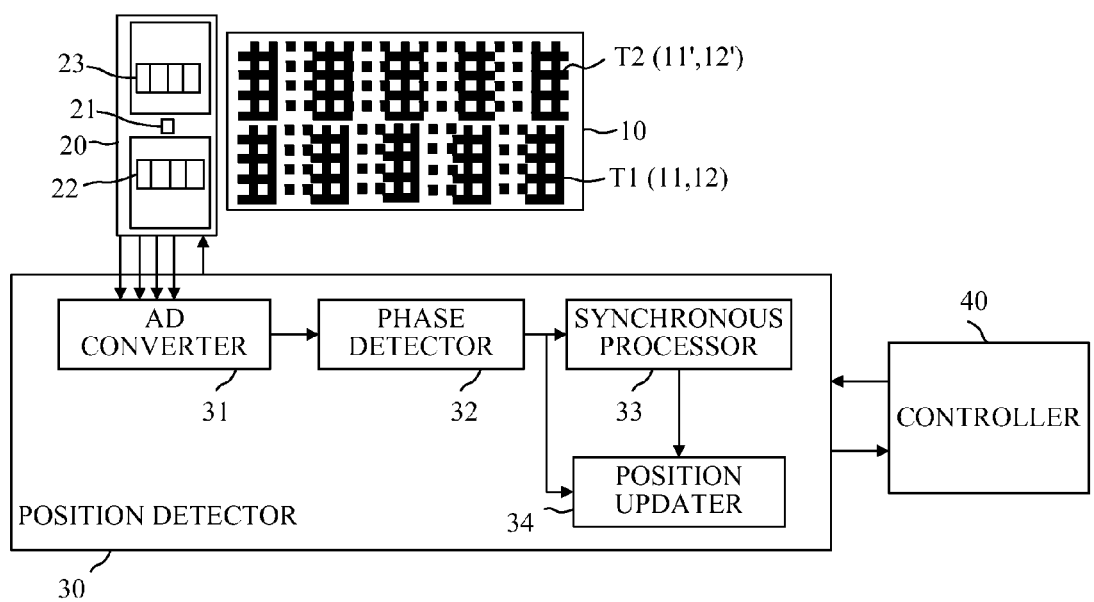
FIG. 4 is a block diagram showing a configuration of an encoder that is Embodiment 2 of the present invention.

FIG. 4 shows a configuration of an encoder that is a second embodiment (Embodiment 2) of the present invention. The encoder of this embodiment is, as well as the encoder of Embodiment 1, an optical reflective absolute encoder that detects a position (absolute position) of one of a scale 10 and a sensor 20, which are relatively moved, with respect to the other thereof. However, this embodiment provides to the scale 10 two tracks T1 and T2 each including a first pattern and a second pattern similar to those in Embodiment 1. On the other hand, this embodiment provides to the sensor 20 two light receivers 22 and 23 similarly configured to the light receiver 22 in Embodiment 1. Other components in this embodiment are same as those in Embodiment 1, and therefore this embodiment will mainly describe differences from Embodiment 1.

Figures 5, 6:
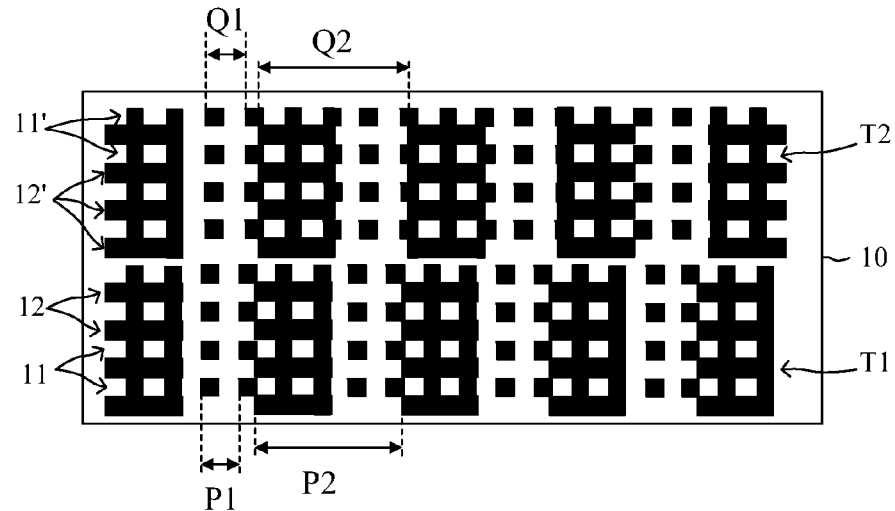
FIG. 5 shows a scale to be used in the encoder of Embodiment 2.
FIG. 6 shows a relationship between times and phases in the encoder of Embodiment 2.

As shown in FIG. 5 in detail, the track T1 in the scale 10 is provided with the first and second patterns 11 and 12 alternately arranged in a width direction of the scale 10, the first and second patterns 11 and 12 having mutually different pitches P1 and P2 in a longitudinal direction of the scale 10. Moreover, the track T2 in the scale 10 is provided with the first and second patterns 11' and 12' alternately arranged in the width direction of the scale 10, the first and second patterns 11' and 12' having mutually different pitches Q1 and Q2 in the longitudinal direction of the scale 10.

Total pattern lengths of the tracks T1 and T2 are equal to each other. The second patterns 12 and 12' have a larger (coarser) period than that of the first patterns 11 and 11'. The first and second patterns 11 and 12 in the track T1 respectively include 160 periods and 40 periods. On the other hand, the first and second patterns 11' and 12' in the track T2 respectively include 152 periods and 39 periods.

The light receiver 22 is constituted by a plurality of photoelectric conversion elements photoelectrically converting light that is emitted from a light source 21 and reflected by reflective portions of each of the first and second patterns 11 and 12 in the track T1. The light receiver 23 is constituted by a plurality of photoelectric conversion elements photoelectrically converting light that is emitted from the light source 21 and reflected by reflective portions of each of the first and second patterns 11' and 12' in the track T2.

The sensor 20 switches a detection period of each of the light receivers 22 and 23 in response to a detection period switch signal from a position detector 30. Specifically, the sensor 20 switches the detection period of each of the light receivers 22 and 23 between a first detection period P0 and a second detection period 4·P0. The first detection period P0 is identical or sufficiently close to the first pitches P1 and Q1, and the second detection period 4·P0 is identical or sufficiently close to the second pitches P2 and Q2.

The light receivers 22 and 23 are brought into a first detection state of enabling reading of the first patterns 11 and 11' in response to setting of the first detection period. The light receivers 22 and 23 respectively read the first patterns 11 and 11' in the first detection state to output first two phase signals as two phase sine-wave signals having a phase difference of 90 degrees. The first two phase signals output from the light receiver 22 has a change period corresponding to the first pitch P1, and the first two phase signals output from the light receiver 23 has a change period corresponding to the first pitch Q1.

The light receivers 22 and 23 are brought into a second detection state of enabling reading of the second patterns 12 and 12' in response to setting of the second detection period. The light receivers 22 and 23 respectively read the second patterns 12 and 12' in the second detection state to output second two phase signals as two phase sine-wave signals having a phase difference of 90 degrees. The second two phase signals output from the light receiver 22 has a change period corresponding to the second pitch P2, and the second two phase signals output from the light receiver has a change period corresponding to the second pitch Q2.

The position detector 30 performs a position detection process described below by using the two pairs of the first and second two phase signals output from the sensor 20 (light receivers 22 and 23). A controller 40 controls, in response to input of a position detection request signal from a system of an apparatus, switching of the detection period of the sensor 20 (that is, output of the detection period switch signal from the position detector 30) and the position detection process performed by the position detector 30.

Next, description will be made of the position detection process performed by the position detector 30. The position detection process includes a first process and a second process performed after the first process. The first process detects (or calculates) a first absolute position of the scale 10 (that is, of the movable member) by using both the first and second two phase signals respectively obtained from the light receivers 22 and 23 whose detection periods are set to the first and second detection periods.

On the other hand, the second process detects (calculates) a relative movement amount of the scale 10 (movable member) and the sensor 20 by using one of the first and second two phase signals obtained from the light receiver 22 set in one of the first and second detection periods. Moreover, the second process detects (calculates) a second absolute position of the scale 10 by using (adding) the detected relative movement amount and the first absolute position. Also in this embodiment, the second process detects the relative movement amount by using the first two phase signals.

At first, the first process sets the detection period of the light receivers 22 and 23 to the second detection periods 4·P0 in response to the detection period switch signal from the position detector 30. With this setting, the sensor 20 (light receivers 22 and 23) outputs two pairs of the second two phase signals respectively corresponding to the second patterns 12 and 12'. In the following description, the second two phase signals corresponding to the second pattern 12 and output from the light receiver 22 is referred to as "P2 signals", and the second two phase signals corresponding to the second pattern 12' and output from the light receiver 23 is referred to as "Q2 signals".

The position detector 30 samples three times the two pairs of the second two phase signals, that is, the P2 signals (first P2 signals), the Q2 signals and the P2 signals (second P2 signals) in this order through an A/D converter 31. Then, the three pairs of the two phase signals, that is, the first P2 signals, the Q2 signals and the second P2 signals are converted into digital signals by the A/D converter 31, and the digital signals are input to a phase detector 32. The phase detector 32 performs arctan calculation on each of the three pairs of the two phase signals to calculate a phase $\theta_{P2\_1}$ of the first P2 signals, a phase $\theta_{Q2}$ of the Q2 signals and a phase $\theta_{P2\_2}$ of the second P2 signals. In the following description, a sampling time at which the sampling of the first P2 signals is performed is defined as 0, a sampling time at which the sampling of the next Q2 signals is performed is defined as $\Delta t$, and a sampling time at which the sampling of the second P2 signals is performed is defined as $\Delta 2t$.

After the sampling of the second two phase signals, the first process switches the detection period of the light receivers 22 and 23 to the first detection period P0 in response to the detection period switch signal from the position detector 30. With this switched setting, the sensor 20 (light receivers 22 and 23) outputs two pairs of the first two phase signals respectively corresponding to the first patterns 11 and 11'. In the following description, the first two phase signals corresponding to the first pattern 11 and output from the light receiver 22 is referred to as "P1 signals", and the first two phase signals corresponding to the first pattern 11' and output from the light receiver 23 is referred to as "Q1 signals".

The position detector 30 samples three times the two pairs of the first two phase signals, that is, the P1 signals (first P1 signals), the Q1 signals and the P1 signals (second P1 signals) in this order through the A/D converter 31. Then, the three pairs of the two phase signals, that is, the first P1 signals, the Q1 signals and the second P1 signals are converted into digital signals by the A/D converter 31, and the digital signals are input to the phase detector 32. The phase detector 32 performs the arctan calculation on each of the three pairs of the two phase signals to calculate a phase $\theta_{P1\_1}$ of the first P1 signals, a phase $\theta_{Q1}$ of the Q1 signals and a phase $\theta_{P1\_2}$ of the second P1 signals. In the following description, a sampling time at which the sampling of the first P1 signals is performed is defined as t, a sampling time at which the sampling of the next Q1 signals is performed is defined as t+Δt, and a sampling time at which the sampling of the second P1 signals is performed is defined as t+Δ2t. The six phases $\theta_{P2\_1}$, $\theta_{Q2}$, $\theta_{P2\_2}$, $\theta_{P1\_1}$, $\theta_{Q1}$ and $\theta_{P1\_2}$ re input to a synchronous processor 33.

FIG. 6 shows a relationship between times and the above-described phases (and phases described later) and a relationship among the phases. In FIG. 6, a most upper row (first row) denotes the times, and subsequent rows denote the phases. Each column denotes the phases corresponding to the time denoted in the first row. Arrows denote interrelationships between the phases. For example, $\theta_{P2}$ is calculated by using $\theta_{P2\_1}$ and $\theta_{P2\_2}$, and $\theta_{P2}$, $\theta_{V1}$, $\theta_{P1}$, $\theta_{V8}$, $\theta_{P2t}$ and $\theta_{V1t}$ are calculated by the following expressions (10) to (18).

Since the second patters 12 and 12' in the tracks T1 and T2 respectively include 40 periods and 39 periods in the total pattern length, a phase difference between the P2 signals and the Q2 signal shows an absolute position. However, the sampling times of $\theta_{P2\_1}$, $\theta_{Q2}$ and $\theta_{P2\_2}$ are different from one another, so that the synchronous processor 33 calculates the phase $\theta_{P2}$ at the time Δt from the phases $\theta_{P2\_1}$ and $\theta_{P2\_2}$ sampled at the times 0 and 2Δt, and then calculates the phase difference. The phase $\theta_{P2}$ at the time Δt is calculated by the expression (10), and the phase difference $\theta_{V1}$ between the P2 signals and the Q2 signals is calculated by the expression (11). This embodiment employs the averaging process described at the end of Embodiment 1 for the calculation of $\theta_{P2}$ at the sampling time Δt of $\theta_{Q2}$.

$$\theta_{P2} = \frac{\theta_{P2\_1} + \theta_{P2\_2}}{2} \tag{10}$$

$$\theta_{V1} = \text{MOD}(\theta_{P2} - \theta_{Q2}, 2\pi) \tag{11}$$

Moreover, since the first patterns 11 and 11' in the tracks T1 and T2 respectively include 160 periods and 152 periods in the total pattern length, a phase difference between the P1 signals and the Q1 signals for eight periods in the total pattern length can be calculated. The phase $\theta_{P1}$ corresponding to the P1 signals at the time t+Δt and the phase difference $\theta_{V8}$ between the P1 signals and the Q1 signals are respectively expressed by the following expressions (12) and (13):

$$\theta_{P1} = \frac{\theta_{P1\_1} + \theta_{P1\_2}}{2} \tag{12}$$

$$\theta_{V8} = \text{MOD}(\theta_{P1} - \theta_{Q1}, 2\pi) \tag{13}$$

The absolute position can be calculated from $\theta_{P2}$, $\theta_{V1}$, $\theta_{P1}$ and $\theta_{V8}$ thus calculated, as well as in Embodiment 1. However, since the sampling time of $\theta_{P2}$ and $\theta_{V1}$ is Δt and on the other hand the sampling time of $\theta_{P1}$ and $\theta_{V8}$ is t+Δt, these sampling times have a difference. Therefore, the synchronous processor 33 in this embodiment corrects the time difference to increase reliability of the position detection.

At first, the synchronous processor 33 calculates a relative movement speed of the scale 10 and the sensor 20 from $\theta_{P2\_1}$ and $\theta_{P2\_2}$, and calculates a relative movement speed thereof from $\theta_{P1\_1}$ and $\theta_{P1\_2}$. Then, the synchronous processor 33 calculates phases $\theta_{P2t}$ and $\theta_{V1t}$ corresponding to $\theta_{P2}$ and $\theta_{V1}$ at the time t+Δt. In the following description, the relative movement speed calculated from $\theta_{P2\_1}$ and $\theta_{P2\_2}$ is represented by $u_2$, the relative movement speed calculated from $\theta_{P1\_1}$ and $\theta_{P1\_2}$ is represented by $u_1$, an average speed of $u_1$ and $u_2$ is represented by u, and the total pattern length is represented L. These are expressed by the following expressions (14) to (18):

$$u_2 = \frac{P_2 \cdot \frac{(\theta_{P2\_2} - \theta_{P2\_1})}{2\pi}}{2\Delta t} \tag{14}$$

$$u_1 = \frac{P_1 \cdot \frac{(\theta_{P1\_2} - \theta_{P1\_1})}{2\pi}}{2\Delta t} \tag{15}$$

$$u = \frac{u_1 + u_2}{2} \tag{16}$$

$$\theta_{P2t} = \text{MOD}\left(\theta_{P2} + \frac{2\pi u t}{P_2}, 2\pi\right) \tag{17}$$

$$\theta_{V1t} = \text{MOD}\left(\theta_{V1} + \frac{2\pi u t}{L}, 2\pi\right) \tag{18}$$

The synchronous processor 33 calculates the absolute positions from $\theta_{P2}$, $\theta_{V1}$, $\theta_{P1}$, and $\theta_{V8}$ thus calculated, as well as in Embodiment 1. Specifically, for the total pattern length, $\theta_{V1}$, $\theta_{V8}$, $\theta_{P2}$ and $\theta_{P1}$ respectively include 1 period, 8 periods, 40 periods and 160 periods. Thus, period numbers (integral values) $m_1$, $m_2$ and $m_3$ and absolute positions $\theta_1$, $\theta_2$ and $\theta_3$ are calculated by the following expressions (19) to (24):

$$m_1 = \text{ROUND}\left(\frac{8 \cdot \theta_{V1} - \theta_{VS}}{2\pi}\right) \tag{19}$$

$$\theta_1 = \frac{2\pi m_1 + \theta_{VS}}{8} \tag{20}$$

$$m_2 = \text{ROUND}\left(\frac{40 \cdot \theta_1 - \theta_{P2}}{2\pi}\right) \tag{21}$$

$$\theta_2 = \frac{2\pi m_2 + \theta_{P2}}{40} \tag{22}$$

$$m_3 = \text{ROUND}\left(\frac{160 \cdot \theta_2 - \theta_{P1}}{2\pi}\right) \tag{23}$$

$$\theta_3 = \frac{2\pi m_3 + \theta_{P1}}{160} \tag{24}$$

The synchronous processor 33 sets the thus calculated absolute position (first absolute position) $\theta_3$ to a position updater 34. The position updater 34 outputs information on the absolute position $\theta_3$ to the controller 40. The controller 40 outputs the information on the absolute position $\theta_3$ to the system of the apparatus. Then, the first process is ended.

Next, description of the second process will be made. The second process calculates a relative moment amount of the movable member (scale 10) and the sensor 20 by using the P1 signals (first two phase signals) output from the light receiver 22 that is one of the two light receivers 22 and 23. Then, the second process adds this relative movement amount to the absolute position $\theta_3$ calculated in the first process to calculate a second absolute position as a new absolute position of the movable member (scale 10).

In other words, the second process samples the P1 signals through the A/D converter 31 with the first detection period P0 that is the same detection period as that set last in the first process. Then, the phase detector 32 calculates a phase $\theta_{P1\_3}$ of the P1 signals. The reason why the second process uses the first detection period P0 that is the same detection period as that set last in the first process is same as that described in Embodiment 1. The phase $\theta_{P1\_3}$ corresponds to a relative movement amount of the scale and the sensor 20 after the second process is started.

The phase $\theta_{P1\_3}$ is input to the position updater 34. The position updater 34 calculates an absolute position $\theta_4$ from the phase $\theta_{P1\_3}$ and the absolute position $\theta_3$ calculated in the first process by using the following expressions (25) and (26) where $m_4$ represents a period number for the phase $\theta_{P1\_3}$.

$$m_4 = \text{ROUND}\left(\frac{160 \cdot \theta_3 - \theta_{P1\_3}}{2\pi}\right) \quad (25)$$

$$\theta_4 = \frac{2\pi m_4 + \theta_{P1\_3}}{160} \quad (26)$$

The position updater 34 outputs the thus calculated absolute position (second absolute position) $\theta_4$ to the controller 40. The controller 40 outputs information on the absolute position $\theta_4$ to the system of the apparatus. Then, the second process is ended. Thereafter, performing the second process repeatedly with reference to the absolute position calculated by the previous second process enables continuous calculation of the absolute position of the movable member.

This embodiment described the case of calculating the average speed u of the relative movement speed u2 calculated from $\theta_{P2\_1}$ and $\theta_{P2\_2}$ and the relative movement speed u1 calculated from $\theta_{P1\_1}$ and $\theta_{P1\_2}$ to correct the absolute position by using the average speed u. However, the correction may be made by using only any one of the relative movement speeds u1 and u2. Such correction enables reduction of a number of times of the sampling to reduce a time needed for the position detection.

Moreover, since a coarse pitch increases a speed detectable range and a fine pitch increases speed detection accuracy, the correction may be made by using one of the relative movement speeds u1 and u2 selected according to the detected speed or by using a result of weighting on the relative movement speeds u1 and u2. For example, the speed u can be calculated by the following expressions (27) and (28) using the speeds u1 and u2, a threshold Th and a variable α:

$$\alpha = \begin{cases} 1 & \frac{(u1+u2)}{2} < -Th,\ Th < \frac{(u1+u2)}{2} \\ \frac{(u1+u2)}{2} \cdot \frac{1}{Th} & -Th \leq \frac{(u1+u2)}{2} \leq Th \end{cases} \quad (27)$$

$$u = (1-\alpha) \cdot u_1 + \alpha \cdot u_2 \quad (28)$$

Moreover, a configuration may be employed which outputs an error signal if a difference between the speeds u1 and u2 is larger than an upper limit value (threshold). This configuration is effective particularly to improve reliability of the encoder in an environment where noise is large.

Furthermore, each of the above embodiments described the case of setting the first detection period last in the first process and of using the first detection period without change in the second process. However, another detection period setting may be employed which set the second detection period last in the first process and uses the second detection period without change in the second process. This setting also eliminates the necessity of switching the detection period of the light receiver 22 at the transition from the first process to the second process, which enables rapid start of the second process after the transition.

The number of times and the order of the samplings of the first and second two phase signals described in the above embodiments are merely examples, and therefore any number of times and any order thereof may be used as long as the detection period set in the second period is same as that set last in the first process.

In addition, the above embodiments described the optical encoder that uses the reflected light from the periodic pattern including the reflective and non-reflective portions alternately arranged. However, an alternative embodiment of the present invention includes an optical encoder that uses transmitted light from a periodic pattern including transmissive and non-transmissive portions alternately arranged. Moreover, an alternative embodiment of the present invention includes a magnetic encoder constituted by a magnetic scale and a magnetic sensor.

Embodiment 3

Figure 7:
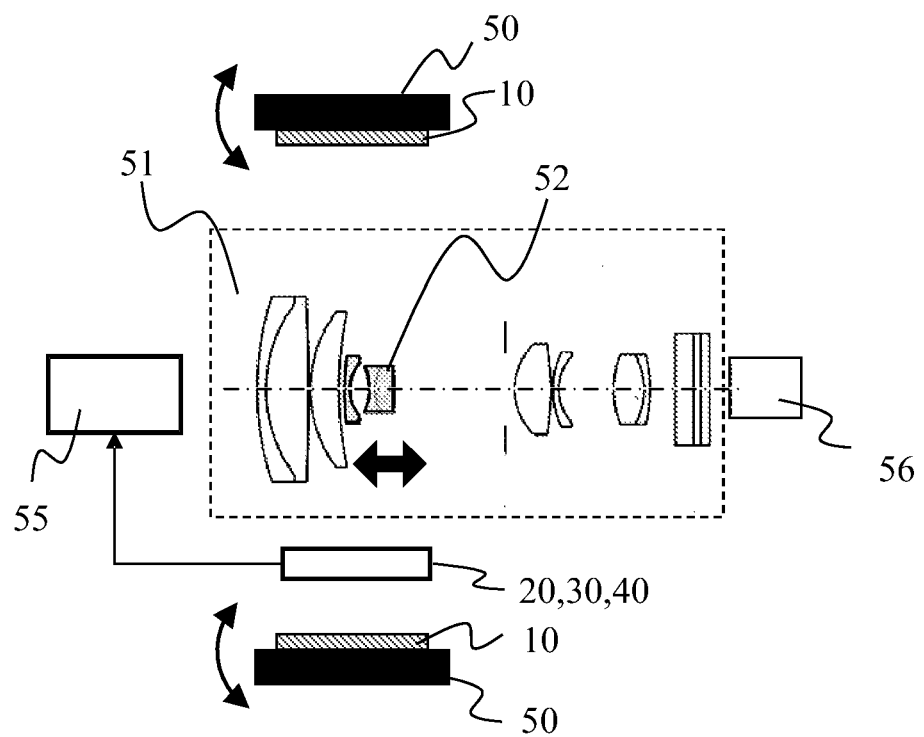
FIG. 7 shows a configuration of an image pickup apparatus that is Embodiment 3 of the present invention.

FIG. 7 shows a configuration of an image pickup apparatus (or an optical apparatus) such as a digital still camera or a video camera, as an example of the apparatus equipped with the encoder described in each of Embodiments 1 and 2. This image pickup apparatus uses the encoder for detecting an absolute position of a movable lens in a lens barrel.

In FIG. 7, reference numeral 10 denotes a scale, reference numeral 20 denotes a sensor, reference numeral 30 denotes a position detector and reference numeral 40 denotes a controller. The scale 10, the sensor 20, the position detector 30 and the controller constitute the encoder described in each of Embodiments 1 and 2. The scale 10 is attached to an inner circumferential surface of a cam ring 50 having a cylindrical shape and being rotatable about an optical axis in the lens barrel. The cam ring 50 is rotatably driven by an actuator (not shown).

The lens barrel houses an image capturing optical system 51. The image capturing optical system 51 includes a movable lens 52 (such as a magnification-varying lens or a focus lens). The movable lens 52 is moved in a direction of the optical axis by a cam formed in the cam ring 50 when the cam ring 50 is rotated.

Reference numeral 55 denotes a CPU that controls an entire system of the image pickup apparatus. Reference numeral 56 denotes an image sensor that photoelectrically converts an object image formed by the image capturing optical system 51. The image sensor 56 is constituted by a CCD sensor or a CMOS sensor.

When the cam ring 50 is rotated for moving the movable lens 52, an absolute rotation position of the cam ring 50, that is, the absolute position of the movable lens 52 in the optical axis direction is detected by the encoder, and information on the detected absolute position (first and second absolute positions) is output to the CPU 55.

The CPU 55 drives the actuator based on the information on the absolute position to rotate the cam ring 50 so as to move the movable lens 52 to a target position.

The encoder described in each of the above embodiments can be used not only for the image pickup apparatus, but also for various optical apparatuses such as a printer performing position detection of a print head or a sheet-supplying roller, a copier performing position detection of a photoconductive drum, and a robot performing position detection of a robot arm.

Furthermore, the present invention is not limited to these embodiments and various variations and modifications may be made without departing from the scope of the present invention.

This application claims the benefit of Japanese Patent Application No. 2011-227200, filed on Oct. 14, 2011 which is hereby incorporated by reference herein in its entirety.

What is claimed is:

1. An encoder comprising:
a scale provided with a first periodic pattern and a second periodic pattern having a period larger than that of the first periodic pattern;
a detector relatively movable with respect to the scale and whose detection state is switchable between (a) a first detection state to read the first periodic pattern and output a first signal having a changing period corresponding to the first periodic pattern and (b) a second detection state to read the second periodic pattern and output a second signal having a changing period corresponding to the second periodic pattern; and
a processor configured (a) to perform a first process to detect a first absolute position by using both the first and second signals respectively obtained from the detector set in the first and second detection states and (b) to perform, after performing the first process, a second process to calculate a relative movement amount by using a specific signal that is one of the first and second signals obtained from the detector set in one of the first and second detection states and detect a second absolute position by using the relative movement amount and the first absolute position,
wherein the processor is configured to obtain in the second process the specific signal from the detector set in a same detection state of the first and second detection states as that set last in the first process.

2. An encoder according to claim 1, wherein the processor is configured to set the first detection state last in the first process.

3. An encoder according to claim 1, wherein the processor is configured to set the first detection state first and last in the first process.

4. An encoder according to claim 1, wherein the processor is configured, in the first process, (a) to sample the first and second signals at a plurality of sampling times and calculate a relative movement speed of the scale and the detector by using the sampled signals, (b) to calculate a phase of each of the first and second signals, (c) to correct the phase by using the relative movement speed and the sampling times, and (d) to calculate the first absolute position from the corrected phase.

5. An apparatus comprising:
an encoder; and
a movable member whose position is detected by the encoder,
wherein the encoder comprises:
a scale provided with a first periodic pattern and a second periodic pattern having a period larger than that of the first periodic pattern;
a detector relatively movable with respect to the scale and whose detection state is switchable between (a) a first detection state to read the first periodic pattern and output a first signal having a changing period corresponding to the first periodic pattern and (b) a second detection state to read the second periodic pattern and output a second signal having a changing period corresponding to the second periodic pattern; and
a processor configured (a) to perform a first process to detect a first absolute position by using both the first and second signals respectively obtained from the detector set in the first and second detection states and (b) to perform, after performing the first process, a second process to calculate a relative movement amount by using a specific signal that is one of the first and second signals obtained from the detector set in one of the first and second detection states and detect a second absolute position by using the relative movement amount and the first absolute position,
wherein the processor is configured to obtain in the second process the specific signal from the detector set in a same detection state of the first and second detection states as that set last in the first process.

6. An encoder comprising:
a scale including a first periodic pattern having a first period and a second periodic pattern having a second period different from the first period;
a detector relatively movable with respect to the scale and whose detection state is switchable between (a) a first detection state to read the first periodic pattern and output a first signal corresponding to the first periodic pattern and (b) a second detection state to read the second periodic pattern and output a second signal corresponding to the second periodic pattern; and
a processor configured (a) to perform a first process and a second process after performing the first process, wherein the processor is configured to obtain, in the first process, a first absolute position by using the second signal output by the detector in the second detection state and the first signal output by the detector in the first detection state after outputting the second signal, and
wherein the processor is configured, in the second process, to obtain a relative movement amount by using the first signal output by the detector in the first detection state and thereafter to obtain a second absolute position by using the first absolute position and the relative movement amount.

7. An encoder according to claim 6, wherein the processor is configured to set the first detection state last in the first process.

8. An encoder according to claim 6, wherein the processor is configured to set the first detection state first and last in the first process.

9. An encoder according to claim 6, wherein the processor is configured, in the first process, (a) to sample the first and second signals at a plurality of sampling times and calculate a relative movement speed of the scale and the detector by using the sampled signals, (b) to calculate a phase of each of the first and second signals, (c) to correct the phase by using the relative movement speed and the sampling times, and (d) to calculate the first absolute position from the corrected phase.

10. An encoder according to claim 6, wherein the first period is shorter than the second period.

11. An apparatus comprising:
an encoder; and
a movable member whose position is detected by the encoder, wherein the encoder comprises:

a scale including a first periodic pattern having a first period and a second periodic pattern having a second period different from the first period;

a detector relatively movable with respect to the scale and whose detection state is switchable between (a) a first detection state to read the first periodic pattern and output a first signal corresponding to the first periodic pattern and (b) a second detection state to read the second periodic pattern and output a second signal corresponding to the second periodic pattern; and a processor configured (a) to perform a first process and a second process after performing the first process, wherein the processor is configured to obtain, in the first process, a first absolute position by using the second signal output by the detector in the second detection state and the first signal output by the detector in the first detection state after outputting the second signal, and wherein the processor is configured, in the second process, to obtain a relative movement amount by using the first signal output by the detector in the first detection state and thereafter to obtain a second absolute position by using the first absolute position and the relative movement amount.

\* \* \* \* \*